(12) United States Patent
Toddenroth et al.

(10) Patent No.: US 10,583,855 B2
(45) Date of Patent: Mar. 10, 2020

(54) STEERING DEVICE FOR A VEHICLE, IN PARTICULAR AN ELECTRIC VEHICLE

(71) Applicant: Byton Limited, Hong Kong (HK)

(72) Inventors: Sebastian Toddenroth, Munich (DE); Felipe Roo-Clefas, Munich (DE); Wolfram Luchner, Los Altos Hills, CA (US)

(73) Assignee: Byton GmbH, Ismaning (DE)

( * ) Notice: Subject to any disclaimer, the term of this patent is extended or adjusted under 35 U.S.C. 154(b) by 6 days.

(21) Appl. No.: 15/696,143

(22) Filed: Sep. 5, 2017

(65) Prior Publication Data

US 2019/0071112 A1    Mar. 7, 2019

(51) Int. Cl.
*B60R 21/203*    (2006.01)
*B62D 1/04*    (2006.01)
(Continued)

(52) U.S. Cl.
CPC .............. *B62D 1/046* (2013.01); *B60K 35/00* (2013.01); *B60K 37/06* (2013.01); *B60R 11/0252* (2013.01); *B60R 21/2032* (2013.01); *B60R 21/2035* (2013.01); *B60R 21/215* (2013.01); *B62D 1/105* (2013.01); *B60K 2370/128* (2019.05); *B60K 2370/139* (2019.05); *B60K 2370/1438* (2019.05); *B60K 2370/1442* (2019.05); *B60K 2370/152* (2019.05); *B60K 2370/685* (2019.05); *B60K 2370/782* (2019.05);
(Continued)

(58) Field of Classification Search
CPC ........ B60K 2350/928; B60K 2370/152; B60K 2370/782; B60K 2370/1438; B60R 21/2032; B62D 1/046; B62D 1/105
See application file for complete search history.

(56) References Cited

U.S. PATENT DOCUMENTS 3,669,465 A    6/1972    Vacante
3,680,884 A    8/1972    Stephenson
(Continued)

FOREIGN PATENT DOCUMENTS

CN    106926806 A    7/2017
CN    108583498 A    9/2018
(Continued)

OTHER PUBLICATIONS

International Search Report and the Written Opinion of the International Searching Authority for International Application No. PCT/2018/000972 dated Feb. 7, 2019.
(Continued)

*Primary Examiner* — James A English
(74) *Attorney, Agent, or Firm* — Womble Bond Dickinson (US) LLP

(57) ABSTRACT

A steering device for a vehicle having a steering wheel, a steering wheel hub or steering wheel spokes which are connected in a rotationally fixed manner to the steering wheel for transmission of a steering motion, a central part which is disposed in a stationary position with respect to the steering wheel in a central region defined by the steering wheel and which has a visible surface area in the central region formed predominantly by a screen display and wherein the screen display is an input/output device and is configured for control of at least one functionality of the vehicle.

20 Claims, 9 Drawing Sheets

(51) Int. Cl.
*B60K 35/00* (2006.01)
*B60K 37/06* (2006.01)
*B62D 1/10* (2006.01)
*B60R 11/02* (2006.01)
*B60R 21/215* (2011.01)
*B60R 11/00* (2006.01)

(52) U.S. Cl.
CPC ... *B60K 2370/816* (2019.05); *B60R 2011/001* (2013.01)

(56) References Cited

U.S. PATENT DOCUMENTS

| | | | |
|---|---|---|---|
| 3,744,817 A | 7/1973 | Ousset | |
| 5,085,465 A | 2/1992 | Hieahim | |
| 5,609,356 A * | 3/1997 | Mossi | B60R 21/2032 280/728.1 |
| 5,722,686 A | 3/1998 | Blackburn | |
| 5,893,580 A | 4/1999 | Hoagland | |
| 5,947,514 A | 9/1999 | Keller | |
| 6,189,919 B1 | 2/2001 | Sinnhuber | |
| 6,394,489 B1 * | 5/2002 | Faigle | B60R 21/2035 280/731 |
| 6,530,596 B2 * | 3/2003 | Sinnhuber | B60R 21/2032 280/731 |
| 7,287,618 B2 | 10/2007 | Okamoto | |
| 7,296,795 B2 | 11/2007 | Kong | |
| 7,325,827 B2 | 2/2008 | Reiter | |
| 7,931,296 B2 | 4/2011 | Choi | |
| RE43,413 E | 5/2012 | Sinnhuber | |
| 9,409,538 B2 | 8/2016 | Gorman | |
| 9,550,514 B2 | 1/2017 | Schulz | |
| 10,144,382 B2 | 12/2018 | Shanks | |
| 2003/0001366 A1 | 1/2003 | Debler | |
| 2009/0189373 A1* | 7/2009 | Schramm | B60K 35/00 280/731 |
| 2012/0074674 A1* | 3/2012 | Ohoka | B60R 11/0235 280/728.3 |
| 2016/0001807 A1* | 1/2016 | Hans | B62D 1/046 345/173 |
| 2017/0072984 A1* | 3/2017 | Gong | B62D 1/105 |
| 2019/0039550 A1* | 2/2019 | Eckert | B60R 21/20 |
| 2019/0071055 A1* | 3/2019 | Luchner | B60W 50/08 |
| 2019/0071112 A1 | 3/2019 | Toddenroth | |
| 2019/0073111 A1* | 3/2019 | Luchner | G07C 5/0825 |

FOREIGN PATENT DOCUMENTS

| | | |
|---|---|---|
| DE | 4225709 A1 | 2/1994 |
| EP | 1249373 A2 | 10/2002 |
| EP | 2033850 A2 | 3/2009 |
| JP | 2010036882 A | 2/2010 |

OTHER PUBLICATIONS

International Search Report and the Written Opinion of the International Searching Authority for International Application No. PCT/EP2018/073437 dated Feb. 1, 2019.

* cited by examiner

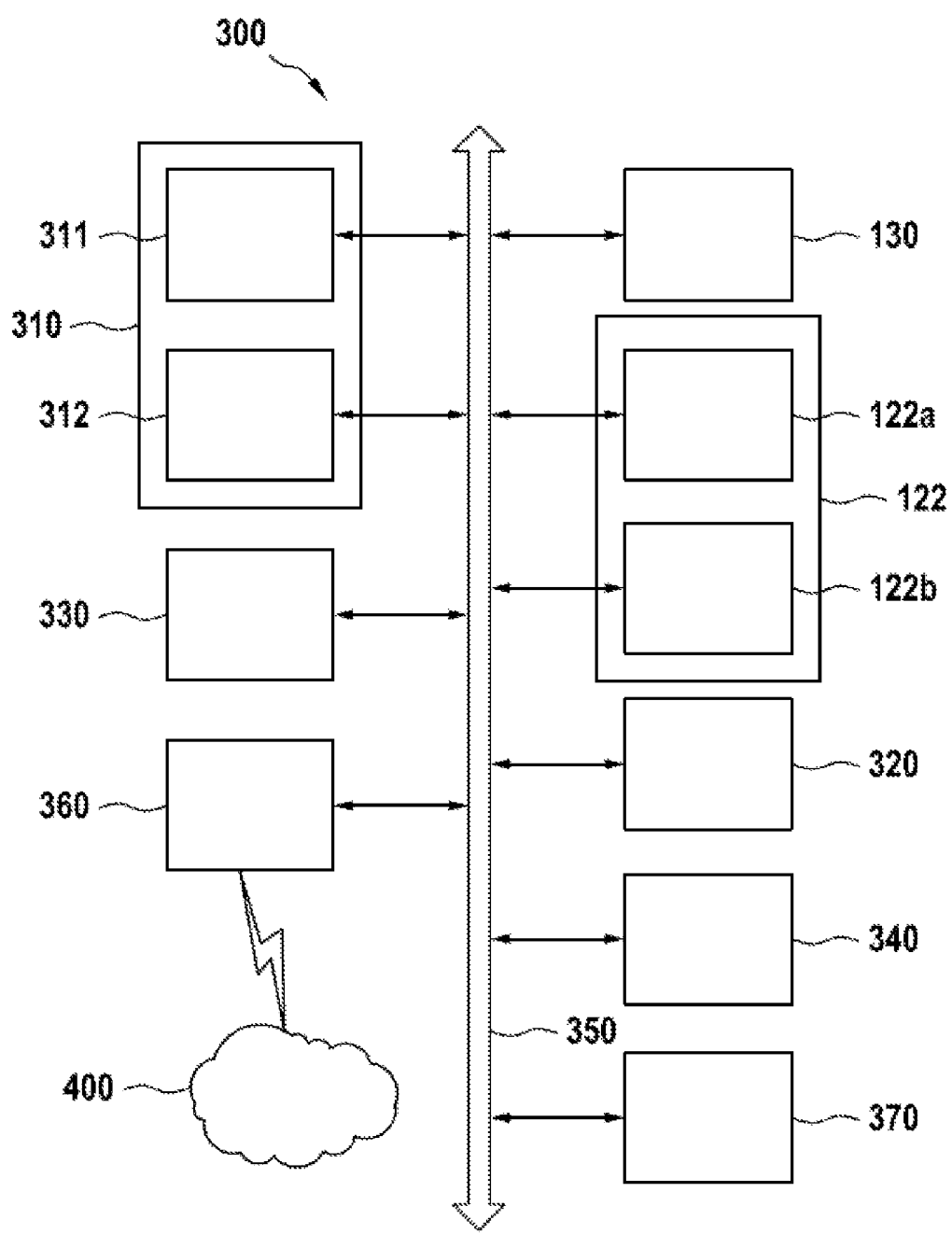

STEERING DEVICE FOR A VEHICLE, IN PARTICULAR AN ELECTRIC VEHICLE

FIELD

The invention relates to a steering device.

BACKGROUND

Steering wheels as the steering device for a vehicle, which is to be steered in the usual way by turning the steering wheel, are fundamentally known. In particular, there are known steering wheels having a central part disposed in a stationary position with respect to a rotatably mounted steering wheel rim for steering the vehicle. For example, DE 3 940 391 C2 discloses a steering wheel for a motor vehicle, wherein a central part disposed in the steering wheel is mounted in a stationary position.

In addition, it is known and in certain countries it is necessary to provide an airbag in the central part of the steering wheel as a safety device for a user in the event of a collision of the vehicle. For example, DE 19 503 816 A1 discloses a driver airbag disposed in a central portion of the steering wheel.

Finally, it is also known that operating elements for functions of the motor vehicle can also be integrated into a central part of a steering wheel, as is known from EP 1 762 421 A1, for example.

In the event of deployment of a driver airbag in a collision of a motor vehicle, it is necessary to ensure that, among other things, parts of the vehicle disposed above and adjacent to the airbag do not interfere with deployment of the airbag, but also in particular there should not be any additional risk of injury associated with deployment of the airbag, such as splinters formed on the cover of the airbag. In the case of a driver airbag, this is achieved by a suitable separate arrangement for additional functionalities in the central part of the steering wheel. Therefore, the space provided for the airbag is kept free of other functionalities, such as operating elements, for example, by not setting them up in such regions of the central part, where the surfaces belong to the airbag cover which must be opened in the event of deployment of the airbag to allow it to be unfolded.

Therefore, most of the surface of the central part of a steering wheel is usually lost to the airbag functionality.

In modern vehicles it is desirable to display for the user required user information in the most ergonomic way possible as well as intuitively. For example, this may include information about the condition of the vehicle, navigation information, information associated with the vehicle entertainment system, etc., to name but a few examples. In today's vehicles, some of these user information displays are located in the central region of the cockpit, for example, in or between the usual instrument for speed and engine rpm, if necessary. Alternatively or additionally, it is known that one or more display screens of the user information system may be installed in a central region of the dashboard and in combination with a radio and/or navigation device. Relevant information for the driver of a vehicle is thus distributed among various displays and therefore to various locations.

In known vehicles, the operation of numerous functionalities of the vehicle is distributed among a wide variety of input means and input locations. For example, operating elements for the seat adjustment are often located at the side of a seat and can be touched only while driving and must be operated without sight. The operating elements for a seat heater, which may optionally be present, are in turn frequently disposed at another location, for example, on the dashboard.

The situation is similar for the operating elements for other functionality which will not be listed here conclusively such as an air conditioning system, a rear window wiper, a rear window heating system, a multimedia/entertainment system, a navigation device, a mobile phone, etc.

Since there are no binding standards for the arrangement of most operating elements in a motor vehicle, the circumstances described above may result in increased distraction of the user, in particular if the user is not yet fully familiar with the operation of the individual functionalities. This also relates in particular to those functionalities that are not needed regularly or very frequently.

There are known vehicles having a central input device for a larger number of the aforementioned functionalities, for example, in the manner of a so-called jog shuttle operating element. The user must nevertheless keep the corresponding visual acknowledgments in sight on a display in the vehicle associated with the respective functionality while controlling them.

SUMMARY

One object of the present invention is to propose an improved steering device for vehicles which will overcome at least one or more of the aforementioned disadvantages of the prior art.

This object is achieved with the features of the independent claims. Additional features and details, in particular exemplary embodiments and advantageous refinements of the invention are derived from the dependent claims, the specification and the drawings.

A basic idea of the present invention thus consists first of utilizing the predominant amount of the surface of a central part disposed in the central region of a steering wheel for disposition or integration of a screen display. Because of the proximity to the user of the system (vehicle driver or user of a vehicle), the surface of the central portion disposed in the steering wheel is especially suitable for this. As the screen display provided there additionally serves as an input unit, for example, in the form of a touch screen display, basically all functionalities of the vehicle can be operated at a central location, namely in the stationary central portion of the steering device, and visual acknowledgments and status reports can also be acknowledged by the user at the same location.

In a refinement of the invention, it is ensured that an airbag will require a significantly smaller surface area for an airbag cover in comparison with the prior art and can therefore be disposed in such a way that a sufficiently rapid and reliable unfolding of the airbag in the event of it deployment can nevertheless take place and the airbag will be able to deploy between the steering device and in front of the screen display which is now disposed on and/or integrated into the central part so that the user is protected from injuries due to the steering device and/or the screen display provided on the central part. Among other things, this is achieved in that the predominant portion of the visible surface area remaining in the central region of the steering wheel, i.e., the region without a screen display is used for the airbag cover. "Predominant" in this context means essentially more than 50% or more.

A first aspect of the present invention relates to a steering device for a vehicle comprising a steering wheel, a steering wheel hub or steering wheel spoke connected in a rotationally fixed manner to the steering wheel for transmission of a steering motion, a central part disposed in a stationary position with respect to the steering wheel in a central region defined by the steering wheel, the visible surface area of said central part being visible in the central region and formed predominantly by a screen display.

The screen display may be embodied as an input-output device, for example, as a touch-sensitive screen display (touch screen) and configured for controlling at least one, preferably a plurality of functionalities of the vehicle.

In one refinement of the steering device, the remaining portion of the surface of the central portion that is visible in the central region may serve the function of integration of a required airbag cover of the central portion adjacent to the screen display.

An airbag unit having an airbag may be disposed in the central portion beneath the airbag cover so that on deployment the airbag can unfold by opening of the airbag cover in front of the steering device and in particular in front of the screen display. On opening, the airbag cover may unfold downward, i.e., away from the screen display.

In the event of a detected collision of the vehicle, the airbag unit may be equipped to unfold the airbag contained in the airbag unit between the steering device and the screen display, on the one hand, and a user of the vehicle, on the other hand.

The steering wheel may be coupled or connected via the steering wheel hub or steering wheel spoke to a rotatable steering shaft for transmission of the steering motion to the steering shaft. "Coupled" in this context should mean that, as an alternative to a rotationally fixed connection between the steering wheel and the steering shaft, a transmission may be provided to convert a small rotational angle on the steering wheel to a larger rotational angle on the steering shaft and/or to decouple a rotation of the steering shaft, for example, in an autonomous driving mode of the vehicle, from the steering wheel in order to allow the steering wheel to come to a stop in autonomous driving.

The airbag unit may be disposed in such a way relative to a display plane defined by the screen display, such that the airbag outlet direction is inclined in the direction of the screen display and in this way forms an acute angle with the plane of the display. In other words, the outlet direction of the airbag may be oriented in such a way that, in the event of its deployment, the airbag does not emerge at a right angle to the plane of the display of the screen display. That is, the airbag can emerge from the airbag unit obliquely to the plane of the display. In other words, the container diameter of the airbag container at the airbag outlet opening may lie in a plane inclined relative to the plane (plane of the display) defined by the screen display. In particular, the outlet direction of the airbag, starting from the neighboring arrangement of the airbag unit, may be inclined relative to the screen display in the direction of the screen display, so that the airbag is already able to unfold because its outlet direction is in front of the screen display. This compensates for the fact that the airbag is no longer disposed centrally in relation to the steering wheel axis because of its proximity to the screen display, which covers most of the surface area of the central portion, for example, more than ½ or ⅔ of the surface area.

In this context, it is advantageous that the central part is disposed in a stationary position. Therefore, the arrangement of the screen display and the airbag unit relative to the user sitting behind them can always be the same, regardless of the current rotational position of the steering wheel. This can be achieved through the proposed arrangement of the airbag unit. One result of this is that the screen display may therefore be situated almost centrally on the central part.

The airbag cover may be disposed so that it is somewhat elevated with respect to the screen display. In other words, the plane defined by the surface of the airbag cover may be situated above the plane of the display formed by the screen display.

The airbag unit may have an airbag container for accommodating the airbag before it is deployed out of the airbag container. The airbag container may have a container length greater than the container diameter of the airbag container at an airbag outlet opening. In other words, in comparison with the airbag devices known from the prior art, the airbag is accommodated in the airbag container in such a way that the airbag requires only a relatively small cross-sectional area of the airbag outlet opening in comparison with the usual airbags. Although this does necessitate a greater installation depth for the airbag unit in comparison with the prior art, it does, however, solve a target conflict with respect to the desired use of the surface of the central part in the central region defined by the steering wheel.

The airbag container may be a tubular, cylindrical or conical container.

The airbag outlet opening and/or the airbag container may have a cross-sectional area that is defined by a small container axis and a large container axis.

The steering device may be provided for disposition in a passenger area of a motor vehicle.

The screen display may be touch-sensitive screen display, for example, a touch screen display. Thus the stationary central part can serve not only as a central information surface for a user but may also be used as a central input interface for the user to offer adjustment options for a user for the information that can be displayed optionally on the screen display with a suitable configuration.

Alternatively or additionally, adjustment options for certain functionalities of a vehicle in which the control device is installed may also be displayed optionally or automatically for the user, depending on the context, on the screen display.

The screen display may either be fixedly integrated into the central part of a steering device or may be integrated releasably into the central part.

For example, the screen display may be integrated fixedly into the central part in the form of a touch-sensitive flat screen, for example, a TFT monitor and coupled electrically and mechanically to the vehicle accordingly.

Alternatively, the screen display may be a tablet computer, which is detachably inserted into a corresponding receptacle in the central part and therefore can be mechanically connected to the central part. A necessary operative and communicative connection to a control unit of the vehicle may be implemented in an essentially known way by means of an electromechanical plug connection, which is provided anyway on a tablet computer or a near field radio connection, such as Bluetooth, NFC (near filed communication), WLAN or the like which is also present on modern tablet computers.

In one refinement, in addition to touch-sensitive screen displays, configurable input elements may also be integrated next to it. The input elements may be disposed on one or both side edges of the screen display. "Side edges" are the edges at the right and left of the screen display in a view of the stationary central part from above when installed in the intended position in a vehicle. In other words, when installed in the intended positions, these right and left side edges run essentially at a right angle from top to bottom with respect to the plane of the bottom of the vehicle, as defined by the vehicle interior.

These additional input elements may be mechanical or electromechanical input elements. For example, in the simplest case, one input element may be a probe configured for activation or deactivation of a respective functionality of the vehicle.

In one variant, an input element may be embodied as a rocker switch that is known per se and by means of which an input parameter can be varied in two directions of change for that parameter. For example, a rocker switch may be configured as a "+" and "−" input element, which is used to control the loudness (volume) of an entertainment/multimedia system and/or a hands-free device of a mobile wireless function and/or of a sound system.

In one refinement the input element is embodied as a touch-sensitive sliding surface on which a similar operating function like that of the mechanical rocker switch can be implemented more or less with a swipe gesture.

In another refinement, the input element is embodied as a touch-sensitive surface, on which fixedly predetermined values of a function parameter of a functionality of the vehicle are associated with regions of the touch-sensitive surface that are determined selectably.

In one exemplary embodiment, such a touch-sensitive surface may be configured as a selector switch for adjusting a transmission of the vehicle. In other words, the touch-sensitive surface may be subdivided into surface segments of equal size, each segment being associated with a transmission parameter that can be selected exclusively by the user and each segment can be characterized as such by a suitably associated symbol. "Exclusively selectable" here means that always only one of the transmission parameters offered for selection can be activated, i.e., the activation of one of the possible parameter settings goes so far that activation is allowed at all for corresponding deactivation of the transmission parameter that has just been updated for a current setting.

In the example of the configuration of the input element as a selector switch for a transmission parameter, a transmission selection option may be implemented between the available gears of the vehicle. In other words, the user can select between park (P), reverse (R), neutral (N) and the available drive gears (e.g., 1-6) and can thus select the direction of travel and the required or desired gear ratio.

In an alternative embodiment of the configuration of the input element as a selector switch for a transmission parameter, a selection option between the available driving modes of the vehicle may be implemented in the manner of an automatic transmission. In other words, the user may select between park (P), reverse (R), neutral (N) and the available forward driving modes (for example, "D" such as drive and optionally "S" such as sporty, etc., optionally other modes such as "G" for terrain). Thus, in addition to the direction of travel, the required or desired transmission performance and/or chassis tuning may also be selectable. This is an innovative selection option for a vehicle in particular or in the case of an electric vehicle.

Basically, the input elements disposed on the central part of the steering device in addition to the touch-sensitive screen display may also include probes, switches, rocker switches, buttons, slides, etc. for frequently used standard functions.

A second aspect of the invention relates to a steering column in a vehicle with a steering device according to one of the preceding embodiments of the first aspect of the invention.

The airbag unit may be disposed in the surroundings and next to a housing of the steering column.

Furthermore, the longitudinal axis of the airbag container may run next to or in the steering column.

A third aspect of the present invention relates to a system for a vehicle with a steering device according to the first aspect of the invention and a control unit.

The control unit may be operatively and communicatively connected to the screen display. "Communicatively connected" means that the control unit and the screen display are connected by a data link for exchanging image data to be displayed on the screen display. "Operatively connected" means that the screen display embodied as an input device (touch screen), the input being generated by a user by means of touch or touch gestures, is transmitted to the control unit for further processing via the data link and also transmitted to the screen display (touch screen) designed as the input device.

The control unit may be basically integrated into the screen display that is preferably disposed at another location at a distance from the steering device in the vehicle. The control unit may be located at a central location in the vehicle, for example, behind the dashboard.

The airbag unit may also be communicatively and operatively linked to the control unit.

The control unit may be equipped for supplying at least one safety function. For example, the airbag unit may be equipped to be deployed by the control unit in the event of a collision involving the vehicle. To do so, the control unit may be equipped to deploy the airbag unit after collision conditions have been detected in order to eject and deploy the airbag contained in the airbag unit.

The airbag system may have several sensors which are coupled to the control unit. These sensors may be equipped to detect movement data on the vehicle suitable for detecting a collision of the vehicle and for transmitting this information to the control unit. The control unit may be equipped to detect a collision of the vehicle, based at least on the movement data from the sensors and to deploy the airbag unit.

Alternatively or additionally, the control unit may be configured for one or more control functions. In particular the control unit may be operatively and communicatively connected to at least one functionality of the vehicle and may be configured for control and/or transmission of operating parameters/status parameters from and/or setting parameters to this at least one functionality.

For example, the control unit may display on the screen display at least one control element for setting adjustment parameters of at least one functionality of the vehicle for control by a user by means of touch or a touch gesture.

The functionality of the vehicle may be (not exclusively) one of the functionalities mentioned below.

One functionality may be the current driving mode of the vehicle. For example, in the case of a future vehicle equipped for autonomous driving, this may include a selection option for the user on the screen display by means of a corresponding display element between manual driving, semi-autonomous driving or autonomous driving. "Semi-autonomous driving" refers to a driving mode in which the user is still fundamentally driving the vehicle but may be supported in certain aspects of driving and relieved of certain aspects of driving the vehicle. Such functions may also include, for example, but not exclusively: a lane-keeping function, which ensures that the vehicle will remain in the current driving lane; a lane change function, which ensures that the vehicle does not collide with another vehicle when changing lanes, etc.

Another functionality may be an air conditioning system of the vehicle. Accordingly, the usual adjustment options for the climate control of the passenger area of the vehicle may be displayed for the user on the screen display. The adjustment options may include one or more of the following, for example: the air volume supplied to the passenger area from the outside, the choice and setting of air vents present in the vehicle, the adjustment of the desired temperature in the passenger area or in predetermined zones of the passenger area. Also in this context, the adjustment of the seat heating may also be made via the screen display.

Another functionality may be a deicing function and/or a windshield heating function for at least one window of the vehicle. In other words, corresponding operating elements for turning these functions on/off may also be displayed for the user on the screen display.

Another functionality may relate to the adjustment of at least the driver's seat. For example, adjustment options for the inclination of the back rest, the seat height, a lumbar support, etc. may be displayed for the user.

Another functionality may relate to the adjustment and operation of general functions of the vehicle lighting such as light, brightness and/or color of the instruments and/or background lighting of the interior of the vehicle. In this context, it may also be possible to adjust how long certain lights remain on in the interior of the vehicle or on the outside of the vehicle when exiting from the vehicle (coming home function) or when the user approaches the vehicle (leaving home function).

Another functionality may be the adjustment and operation of a speed control device (cruise control functionality).

Another functionality may relate to the adjustment and operation of an entertainment system and/or a multimedia system and/or a sound system of the vehicle.

Another functionality may be the adjustment and operation of a mobile telephone functionality.

Another functionality may be the adjustment of the inclination and/or length in the longitudinal direction of the steering device.

Another functionality may be the locking and/or unlocking of individual doors or all doors or certain combinations of individual doors of the vehicle.

For example, individual doors may be blocked to prevent them from being opened from the inside (child lock function).

For example, only one trunk lid of the vehicle may be controlled for unlocking or locking. In the case of the trunk lid, an adjustment option may be provided alternatively or additionally, by means of which the opening angle of the trunk lid can be adjusted, i.e., how far the trunk lid will open automatically when that function is selected.

For all the aforementioned functionalities as well as corresponding functionalities that were not mentioned, it is true that one or more graphical operating elements belonging to the respective adjustment option may be displayed for the user on the screen display.

A corresponding control input by the user may be detected via the screen display which is embodied as a touch-sensitive screen, transmitted to the control unit and evaluated by the control unit. The control unit in turn transmits the respective control instruction to the corresponding functionality, the control unit then carrying out this function autonomously and acknowledging the corresponding status parameter (parameter of state) to the control unit. The status parameters may in turn be converted from the control unit back to a graphical acknowledgment to the user on the display unit accordingly. Therefore, control over basically any functionality may be made possible for a user at a single central location in the vehicle while at the same time the respective status information of the functionality to be controlled is displayed.

For optimal transparency and intuitive operation, the control options for the individual functionalities may be offered to the user on the screen display with suitable illustrative symbols for selection. As soon as the user has selected a certain symbol by touching it, the screen display may switch the screen content to a corresponding graphical representation of the desired functionality. To do so, special display content adapted to the setting of the respective functionality may be displayed for the user as a graphical user interface to this functionality.

For example, for the functionality "seat setting" the driver's seat may be displayed graphically for the driver's seat wherein the inclination of the back rest can be implemented by a corresponding touch gesture of the back rest which is represented graphically.

During input of such control commands, the user can always obtain an acknowledgment immediately via the suitably updated graphical representation on the screen display. This is helpful in particular with functionalities whose settings are not always directly accessible to an observation by the user.

The control unit can convert the control input into corresponding control commands for the respective functionality and transmit them to the respective functionality. To remain with the example of adjusting the inclination of the back rests of the driver's seat, the control command may be used for corresponding activation of a stepping motor which is provided for the inclination of the back rest such that the motor then adjusts the inclination accordingly.

In a modern vehicle, all the functionalities may of course be furnished with a separate control unit, in particular a control unit designed so that it can in turn be connected to the central control unit of the screen display by means of a bus system, for example, a CAN bus, for the data exchange.

The control unit may also be equipped to display, in addition to the functions described above, graphical symbols for at least one of the following functions on the screen display at predetermined or configurable locations via corresponding data communication: a symbol or icon to allow installed software applications to be displayed on the screen display; a symbol or icon to retrieve a localization function and/or navigation function and have it displayed on the screen display; a symbol or icon to retrieve a mobile telephone function and have it displayed on the screen display; a symbol or icon to retrieve a message exchange function such as short message service (SMS) or email and have it displayed on the screen display and/or to display the status (e.g., "read"/"not read") of SMS and/or email; a symbol or icon to retrieve possible settings of an entertainment system and/or multimedia system and have them displayed on the screen display, etc.

Alternatively or additionally, the control unit may be configured to optionally display at least one of the following (not mentioned conclusively) status parameters (parameters of state) for a user on the screen display: tire pressure values of individual tires or all tires of a motor vehicle, outside temperature, weather data of the surroundings, operating parameters of the vehicle, charge status of a drive battery of the vehicle, parameters of an entertainment system and/or a multimedia system and/or a sound system.

Finally, a fourth aspect of the invention relates to a vehicle, in particular a motor vehicle, preferably an electric vehicle having a steering device according to one embodiment of the first aspect of the invention or a steering column according to one embodiment of the second aspect of the invention or a system according to one embodiment of the third aspect of the invention.

The solution to the problem explained above achieves the result that the central part in the central region of a steering wheel may be used predominantly for integration of a screen display as a graphical user interface with all the functionalities of the vehicle. If necessary, at the same time a required driver's airbag may be integrated into the central part in such a way that the airbag functionality is not impaired and the screen display which is additionally provided at this location does not present any increased risk of injury for the driver of the vehicle.

The invention is particularly suitable for any type of vehicle in which the driver of the vehicle wants to initiate a change in direction of the movement of the vehicle by executing a turn on a steering device. This includes in particular all known motor vehicle for roads and all terrain. However, the invention is also suitable for boats and aircraft when a fundamentally similar steering device is provided.

Additional advantages, features and details of the invention are derived from the following description in which embodiments of the invention are described in detail with reference to the drawings. The features mentioned in the claims and in the specification may each be essential to the invention either individually or in any combination. Likewise the features mentioned above and those explained further here may be used alone or in any combination of multiple features. Components or parts that are identical or have a similar function may be labeled with the same reference numerals. The terms "left," "right," "top" and "bottom" as used in the description of the embodiments refer to the drawings in an orientation with a designation of the figures, which are normally readable. The embodiments illustrated and described here are not to be understood as exclusive but instead have an exemplary character primarily in illustration of the invention. The description serves to inform those skilled in the art and therefore known shapes, structures and/or methods are not illustrated or explained in detail in the description so as not to make it difficult to understand the present specification.

BRIEF DESCRIPTION OF THE DRAWINGS

FIG. 8 shows the system from FIG. 7 in greater detail, in particular to illustrate—human-machine interface functions which can be implemented in certain embodiments of the screen display.

DETAILED DESCRIPTION

Figure 1A:
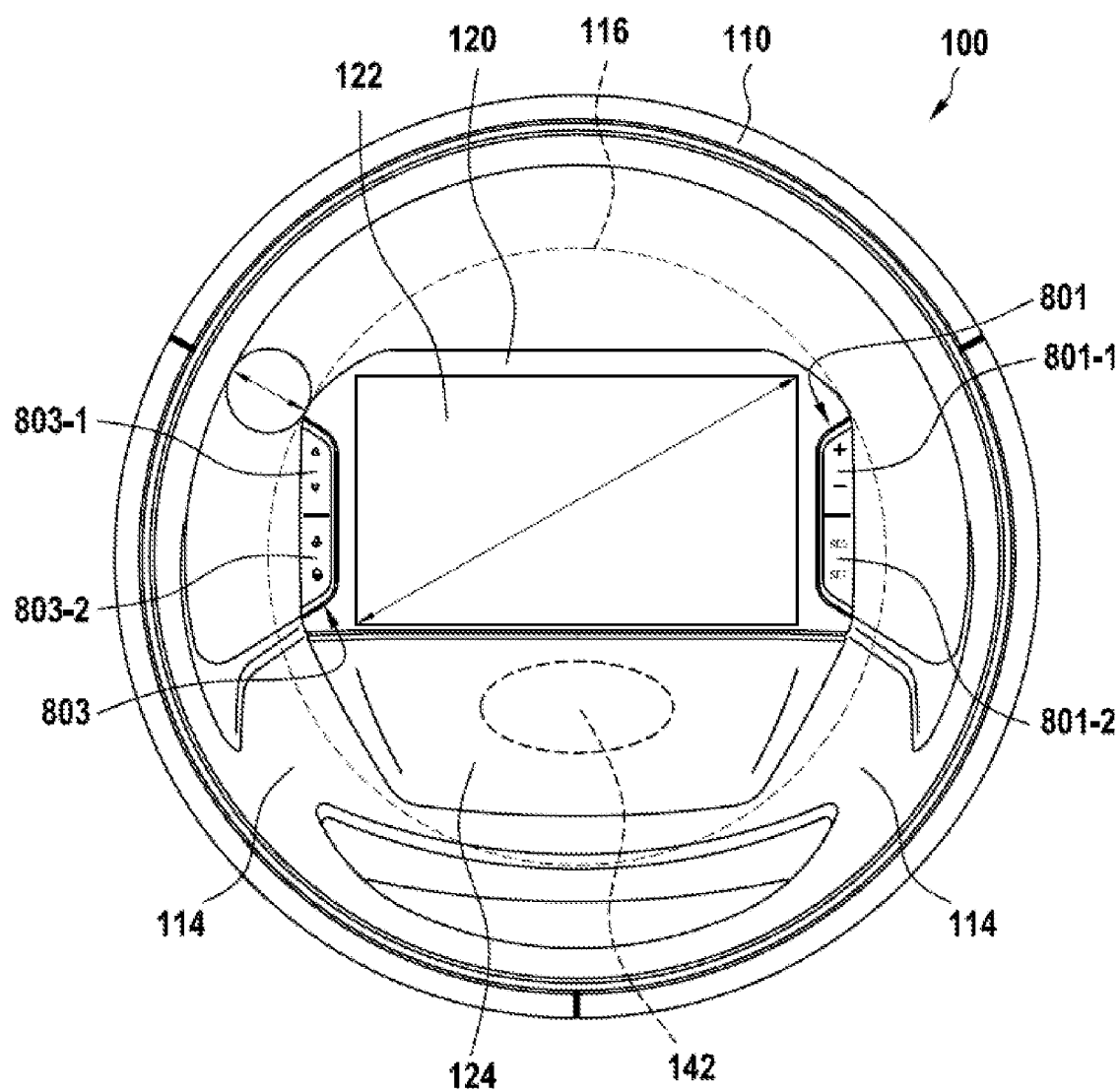
FIGS. 1a-1b shows a top view of a steering device according to the invention, wherein the direction of view of the top view is orthogonal to a plane defined by a steering wheel of the steering device.
Figure 1B:
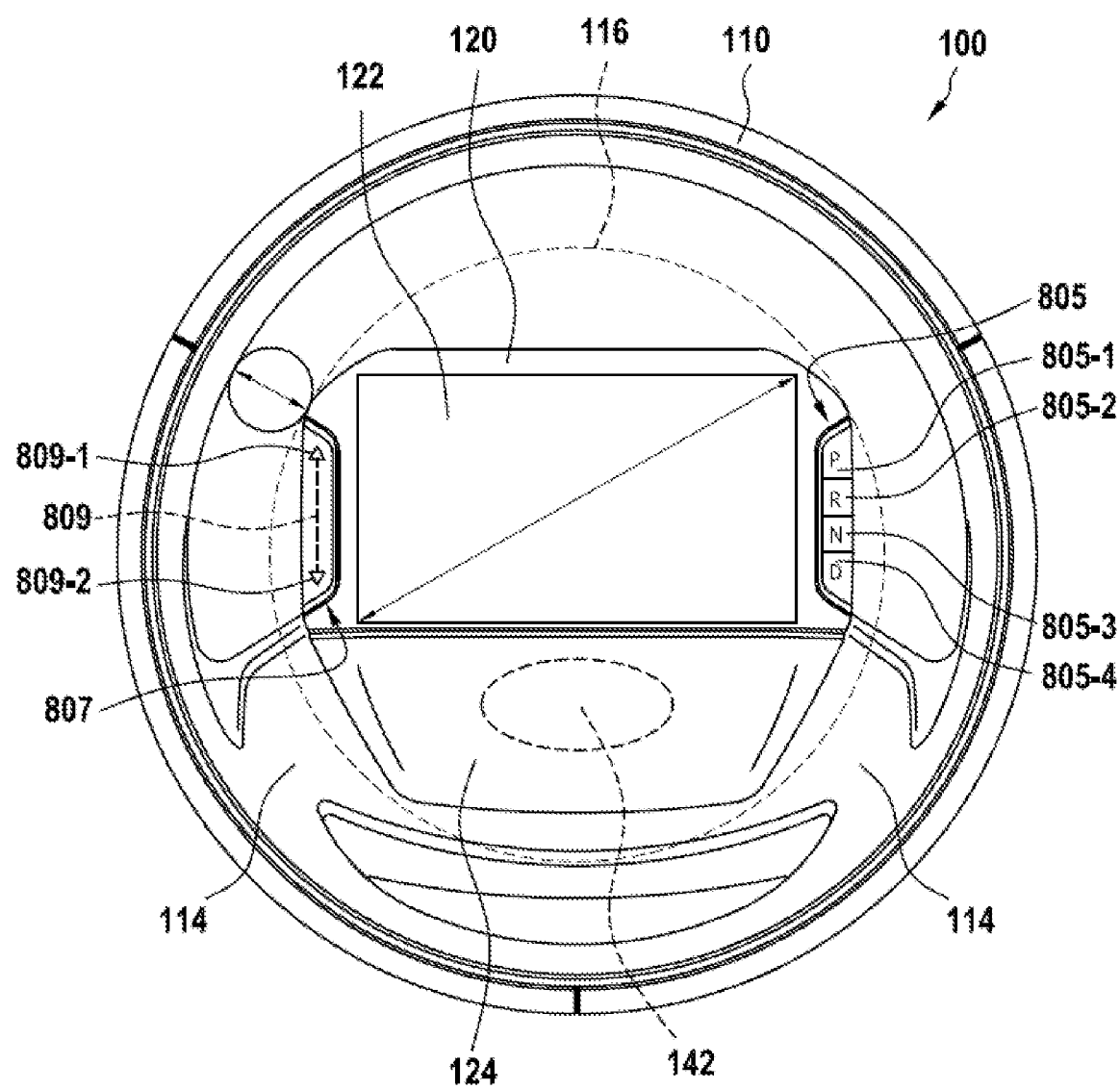
Figure 2:
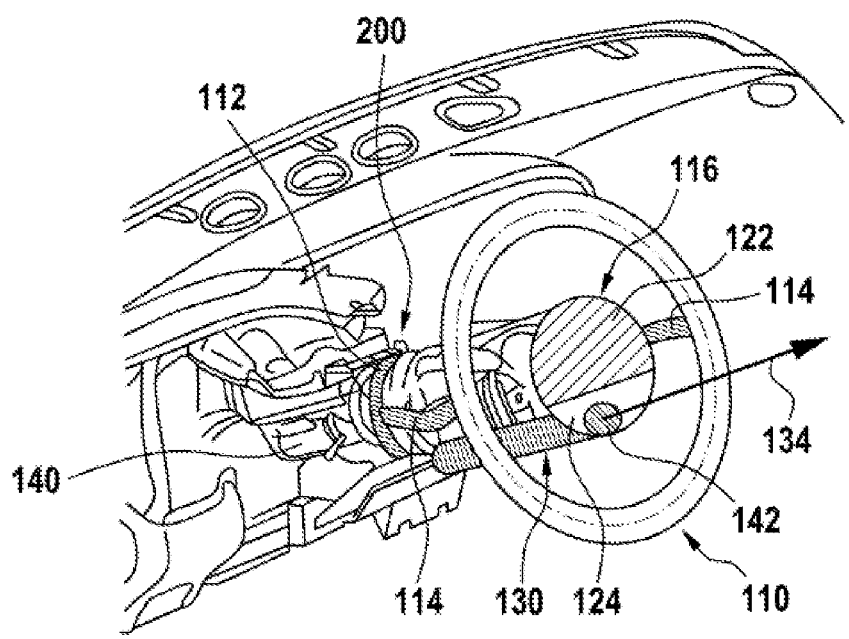
FIG. 2 shows a simplified perspective diagram of a steering device according to the invention disposed on a steering column in the area of the cockpit of a motor vehicle.
Figure 6:
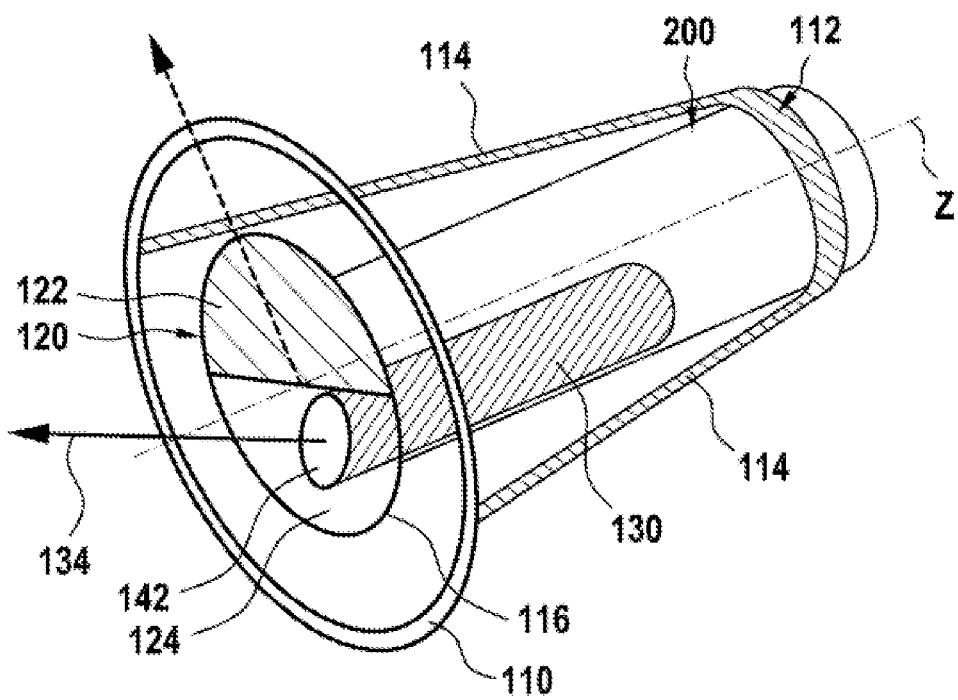
FIG. 6 shows a schematic diagram of a steering device according to the invention on a steering column to illustrate the arrangement of the airbag unit in the steering column behind an airbag cover in the central portion of the steering wheel of the steering device, wherein a predominant portion of the surface area of the central part is available for a screen display.

FIGS. 1a-1b each show a steering device 100 for a vehicle. The steering device 100 consists essentially of a steering wheel 110 having two spokes 114, running in the direction of view toward the rear (i.e., into the plane of the drawing), where they converge at a steering wheel hub, which cannot be seen in FIGS. 1a-1b and is therefore not shown here but is illustrated in FIGS. 2 and 6 (reference numeral 112) as an example.

Steering wheel 110 and spokes 114 form a steering wheel bowl, in which a central part 120 is disposed in a stationary position in a central region 116 of the steering wheel bowl. In other words, the arrangement or position of the central part 120 does not change with clockwise or counterclockwise rotation of the steering wheel 110.

The predominant portion (for example, approx. 60%) of the surface area of the central part 120 which is visible in the view from above is formed by a screen display 122 integrated into the central part 120. Directly adjacent to the screen display 120, most of the remaining portion of the surface area of the central part 120, which is visible in the view from above, is formed by an airbag cover 124. For the sake of illustration, an airbag outlet opening 142 for an airbag unit situated behind it is indicated with a dashed ellipsis behind the airbag cover 124 in FIGS. 1a-1b.

The central region 116 of the steering wheel 110 and of the steering wheel bowl is spaced a sufficient distance away from the inside circumference of the steering wheel 110 so that, when executing steering motions on the steering wheel 110, one's hands are not hindered anywhere, in particular the fingers of the driver of the vehicle, due to the stationary central part 120. This is illustrated by the so-called finger circle in the 10 o'clock position of the steering wheel 110.

The screen display 122 is embodied as a touch-sensitive screen display, namely as a touch screen display in this example. The stationary central part 120 is therefore not only a central information interface for the user but at the same time functions as a central graphical input interface for the user. The user can access suitably configured adjustment options for function setting options of the respective functionalities of the vehicle that are optionally displayable on the screen display 122 by means of adjustment parameters via the screen display 122.

Alternatively or additionally, status information pertaining to such function adjustment parameters or function parameters (status parameters) of the functionalities of the vehicle pertaining to status information either optionally or automatically as a function of context are displayed for the user on the screen display 122.

Examples that can be mentioned here include the function setting parameters of an air conditioning system or status parameters such as the prevailing pressure in the tires of a vehicle or the prevailing reception field strength of a mobile telephone or data radio connection.

The screen display 122 may either be integrated fixedly into the central part 120 of the steering device 100 or the screen display 122 may be fixedly integrated into the central part 120 in the form of a touch-sensitive flat screen, for example, and coupled electrically and mechanically to the vehicle accordingly.

Alternatively, the screen display 122 may be embodied as a tablet computer and integrated detachably into the central part 120. Therefore, the tablet computer, which is detachably inserted into a corresponding receptacle on the central part 120, may be mechanically connected to the central part 120. The required operative and communicative connection to a control unit (for example, 310, see further below) in the vehicle may be implemented in a known way by means of an electromechanical plug connection or a sufficiently secured near field wireless connection such as Bluetooth, NFC (near filed communication), WLAN or the like, for example.

FIGS. 1a-1b show configurable input elements 801, 803 (FIG. 1a) or 805, 807 (FIG. 1b) additionally integrated into the system next to the touch-sensitive screen display 122. In this exemplary embodiment, these input elements are disposed along the two side edges of the screen display 122. "Side edges" thus refer to the edges at the right and left of the screen display 122 in the view of the stationary central part 120 from above, as shown in FIGS. 1a-1b. The steering device 100 is shown in the proper installed position in a vehicle in FIGS. 1a-1b. In the exemplary embodiments in FIGS. 1a and 1b, the right and left side edges run essentially at a right angle from top to bottom.

In the embodiment in FIG. 1a the additional input elements 801, 803 are each electromechanical input elements in the form of a rocker switch 801-1, 801-2, 803-1, 803-2. The respective input parameter can be varied in two directions of change for the parameter by means of the rocker switches 801-1, 801-2, 803-1, 803-2.

In the embodiment in FIG. 1a the input element 801 is configured for controlling a cruise control functionality of the vehicle. The upper rocker switch 801-1 functions as an input element to increase ("+") or reduce ("−") the speed that is regulated automatically by the cruised control functionality. The lower rocker switch 801-2 serves to "set" and "reset ("res")" the cruise control functionality.

In the embodiment in FIG. 1a the input element 803 is configured for controlling the loudness of audio signals emitted via loudspeakers present in the vehicle.

The upper left rocker switch 803-1 is configured to increase ("TIP OF ARROW" upward) or to reduce ("TIP OF ARROW" down) the loudness.

The lower left rocker switch 803-2 is configured as a selector key for the signal source currently available as the audio signal. For example, the signal source for the audio signal may be an entertainment and/or multimedia system or a hands-free device of a mobile telephone function or a sound system of the vehicle. For example, by means of the rocker switch 803-2, it is possible to switch to the various audio signals sources available in various directions in the vehicle.

FIG. 1b illustrates a particularly advantageous embodiment of the input elements 805 and 807 in the form of touch-sensitive sliding surface.

An operating function similar to that achieved with the mechanical rocker switch 803-1 in FIG. 1a is achieved by means of the touch-sensitive sliding surface 807 by means of a swipe gesture 809. In other words, it is possible to change an input parameter such as the prevailing loudness of a signal source by means of the swipe gesture 809 (illustrated as a dashed arrow). For example, the loudness is increased intuitively by a swipe gesture 809 upward 809-1. Accordingly, the loudness can be reduced intuitively by means of a swipe gesture 809 downward 809-1.

The input element 805 at the right in FIG. 1b is also embodied as a touch-sensitive surface, wherein fixedly predetermined values of a function parameter that can be selected by means of a user's touch are associated with a functionality of the vehicle in these predetermined areas of the touch-sensitive surface.

In the embodiment shown in FIG. 1b, the touch-sensitive surfaces constitute exclusive selector switches for setting the transmission of the vehicle. The touch-sensitive surface is therefore subdivided into four surface segments 805-1 to 805-4 of the same size each. Each of these surface sections is associated with a transmission parameter that is exclusively selectable by the user and is characterized as such by a suitably allocated symbol.

In the configuration of the input element 805 in FIG. 1b as a selector switch for a transmission parameter, a selection option between the available driving modes of the vehicle is implemented here according to the known automatic transmission type. In other words, the user can select between the driving modes park position (P), reverse gear (R), neutral (N) and drive (D) and can thereby select the direction of driving as well as the required or desired transmission performance. This is an innovative option for making settings for an electric vehicle as a vehicle with an electric motor in particular.

In the perspective diagram in FIG. 2 it can be seen quite well that the steering wheel 110 in this embodiment has two spokes 114 which converge at a steering wheel hub 112 behind the steering wheel with respect to a plane of the steering wheel defined by the steering wheel 110 and thereby define the steering wheel bowl. The steering wheel bowl is coupled via the steering wheel hub 112 to a steering shaft 140 for transmission of rotational movements executed by the steering wheel 110 to the steering shaft 140. The steering shaft 140 runs in a steering column 200, on which the central part 120 of the steering device 100, which is disposed in the steering wheel bowl, is in a stationary position. The steering wheel 110 is thus mounted rotatably on the steering column 200.

The central part 120 disposed in the central area 116 of the steering device 100 has the surface described in conjunction with FIG. 1 in the view from above, said surface being formed predominantly by the screen display 122 which is integrated there and the airbag cover 124. Beneath the airbag cover 124 is the airbag unit 130 with the airbag outlet opening 142 disposed essentially directly beneath the airbag cover 124.

Figure 2A:
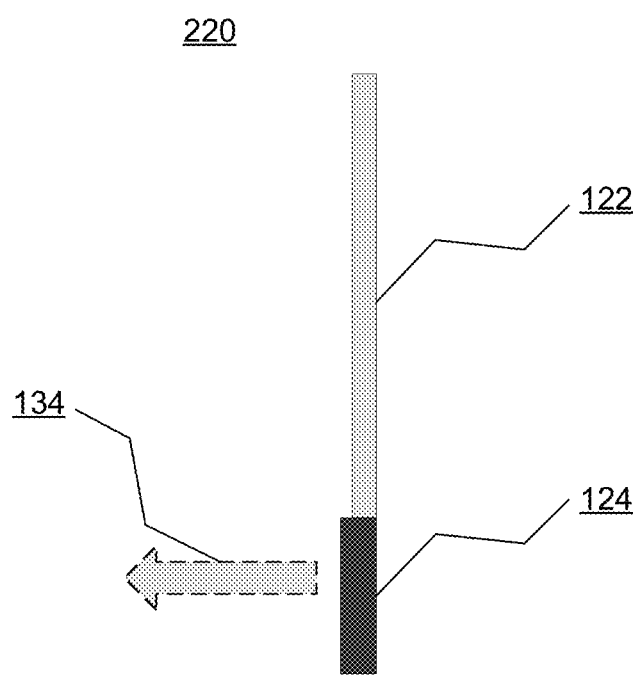
FIG. 2a shows a cross-sectional illustration of a plane formed by a surface of the airbag cover above a plane formed by a surface of the screen display relative to an outlet direction of an airbag.

The airbag unit 130 is thus disposed in or on the central part 120 so that an airbag outlet direction 134 is inclined in the direction of the screen display 122 with respect to the plane of the display formed by the screen display 122. The outlet direction 134 thereby forms an obtuse angle (i.e., an angle greater than 0° but less than 90°) with the plane of the display. As illustrated in FIG. 2a, the airbag cover 124 may be disposed so that it is somewhat elevated with respect to the screen display 122 relative to an outlet direction 134 of the airbag. In other words, the plane defined by the surface of the airbag cover 124 may be situated above the plane of the display formed by the screen display 122.

Figure 3:
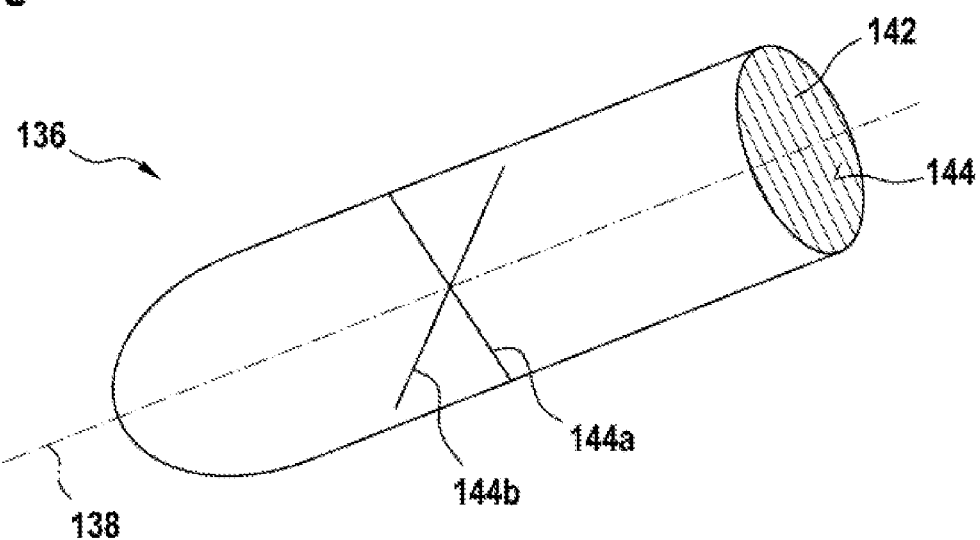
FIG. 3 shows a simplified diagram of an airbag unit for use in the steering device according to the invention.

FIG. 3 shows a simplified diagram of the airbag unit 130 to enable integration of the airbag unit 130 into the central part 120 together with the display device 122 according to the invention. The airbag container 136 of the airbag unit 130 therefore has a longitudinal axis 138, which essentially corresponds to (but need not necessarily match) the outlet direction 134. In addition, the cross-sectional area 144 of the airbag container 136 defines the airbag outlet opening 142 in the area of the end disposed beneath the airbag cover 124 in the installed position.

The cross-sectional area 144 in this exemplary embodiment has a small axis 144a and a large axis 144b. In the event the small axis 144a and the large axis 144b are the same, the airbag container 136 has a cylindrical shape. For the case when the small axis 144a and the large axis 144b are different, the airbag container 136 has an elliptical cross section, i.e., a tubular shape. In all embodiments, the cross-sectional area 144 of the airbag container 136 may increase in the direction of the airbag outlet opening 142 so that the airbag container 136 has a conical shape.

Figure 4:
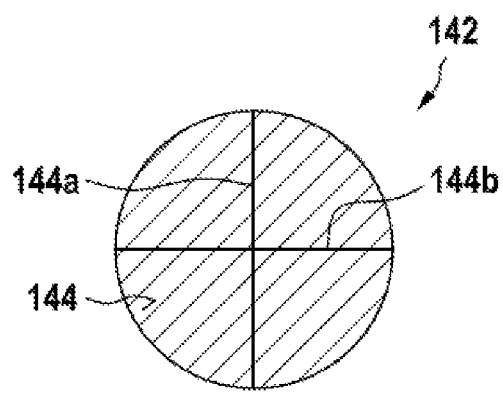
FIG. 4 shows a cross-sectional illustration of the airbag unit from FIG. 3.

To supplement FIG. 3, FIG. 4 illustrates a top view of the airbag outlet opening 142, wherein the cross-sectional area 144 is designed with a circular shape, and the airbag container 136 is designed as a cylinder.

Figure 5:
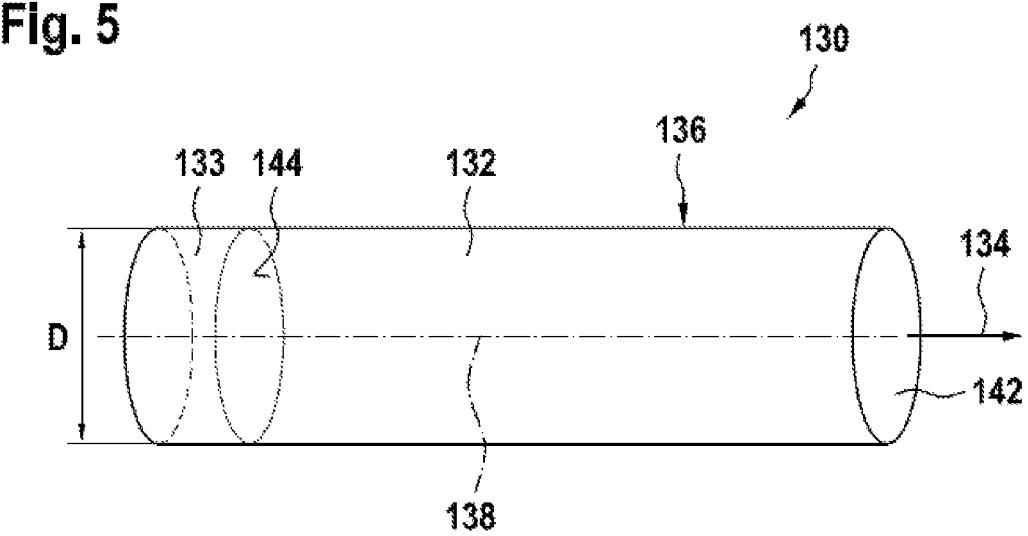
FIG. 5 shows a simplified perspective view of the airbag unit from FIGS. 2 through 4.

FIG. 5 shows another greatly simplified diagram of the airbag unit 130 of the embodiment illustrated in the figures. The airbag container 136 is embodied as a cylinder with a longitudinal axis 138 and a cross-sectional area 144 which is essentially the same over the entire length. The cross-sectional area 144 is defined essentially by the diameter D and is therefore circular in this embodiment and therefore also the airbag container 136 is cylindrical.

At the left end opposite the outlet opening 142, there is a simplified diagram of the location of a propellant charge 132, the triggering of which serves to eject and unfold an airbag 132 (not shown in detail) which is accommodated in the remaining part of the airbag container 136. The airbag 132 is ejected through the airbag outlet opening 142 in the direction of the outlet direction 134 in the case of deployment of the airbag unit 130.

FIG. 6 branches another simplified diagram of the details illustrated in FIGS. 2 to 5 of the steering device 100 according to the invention. It is particularly clear in FIG. 6 that the airbag unit 130 is disposed decentrally relative to a central axis Z of the steering column 200, i.e., it is not disposed centrally. In addition, the outlet direction 134 of the airbag 132 accommodated in the airbag unit 130 with respect to the central axis Z is inclined in the direction of the screen display 122 disposed on the surface of the central part 120, so that the plane of the display of the screen display 122 and the outlet direction 142 form an acute angle. This can be achieved, first, by the fact that the airbag unit 130 and/or the outlet opening 142 are designed so as to yield the desired outlet direction 142. Alternatively or additionally, however, the airbag unit 130 may also be disposed according to the desired of inclination relative to the screen display 122 and/or to the desired outlet direction 142 with respect to the central axis Z (this then does not correspond to the diagram in FIG. 6 but is readily conceivable for those skilled in the art).

The central part 120, the surface of which is formed predominantly by the screen display 122 situated in the central region 116, with the remaining part of the surface area of the central part 120 being formed predominantly by the airbag cover 124 disposed next to the screen display. As already explained elsewhere, the stationary arrangement of the central part 120 in and/or on the steering column 200 makes it possible in particular for the airbag unit 130 to be disposed in a decentralized location relative to the central axis Z and to adjust the desired outlet direction 134. Due to the fact that the central part 120 is disposed in a stationary position with respect to the rotatable steering wheel 110, the position of the airbag unit 130 and the screen display 122 does not change with respect to a user sitting behind the steering device so that the desired and advantageous unfolding of the airbag 132 can be ensured in the event of a collision of the vehicle, regardless of the rotational position of the steering wheel 110 without resulting in the formation of additional injury risks due to the screen display 122 or an altered arrangement of the airbag unit 130 with respect to the user.

Figure 7:
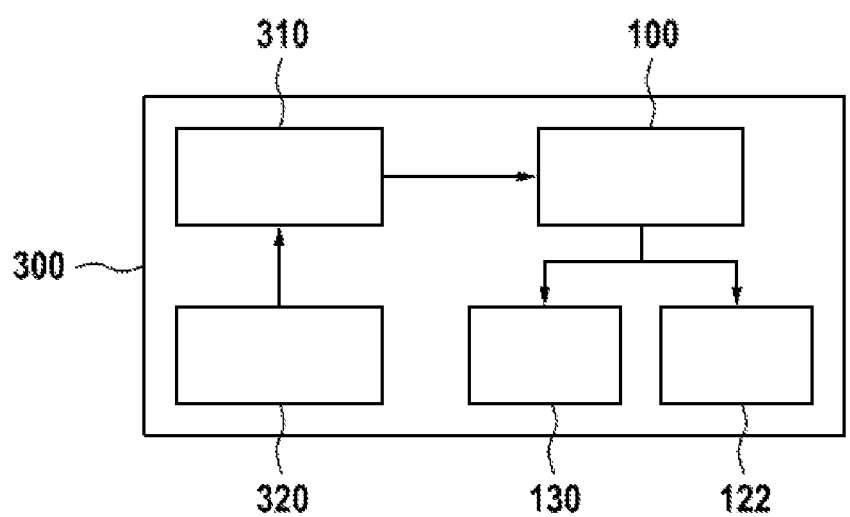
FIG. 7 illustrates a system with a steering device according to the invention, a control unit for detection of collision conditions of a vehicle and for deployment of the airbag unit and sensors for detection of movement data suitable for detecting a collision of the vehicle.

FIG. 7 illustrates a simplified block diagram of a system 300 for supplying control functions and/or safety functions with a steering device 100 such as that described in conjunction with FIG. 1 through 6, and a control unit 310 which is equipped together with the steering device 100 to first supply a safety function.

The airbag unit 130 of the steering device 100 is operatively and communicatively connected to the control unit 310 and is equipped to be deployed by the control unit 310.

The control unit 310 is equipped to deploy the airbag unit 130 of the steering device 100 after detection of collision conditions in order to eject the airbag 132 contained in the airbag unit 130 and to unfold it to protect the user.

For detection of collision conditions, the system 300 preferably has one sensor and especially preferably several sensors 320 which are operatively and communicatively connected to the control unit 310 and are equipped to detect relevant movement data on the motor vehicle containing the system 300 wherein the movement data is suitable for detecting a collision of the vehicle and transmitting appropriate signals to the control unit 310, preferably in real time.

Accordingly, the control unit 310 is equipped to deploy the airbag unit 130 in real time on detection of the existence of collision conditions in order to unfold an airbag 132 contained therein with opening of the airbag cover 124, for example, by bursting, unfolding or rupturing. In the exemplary embodiment illustrated here, the airbag cover 124 (cf. FIGS. 1a-1b) is configured so that it is folded downward—away from the screen display 122—by the airbag as it is deployed.

FIG. 8 shows the system from FIG. 7 in greater detail, for example, in order to illustrate possible human-machine interface functions which may be implemented as an example for a variety of vehicle functionalities and parameters of these functionalities.

The system 300 consists of a plurality of components which are operatively and communicatively interconnected via communication bus 350, for example, a CAN bus.

Components of the system 300 are first the control unit 310, which is also shown in FIG. 7, having a processor 311 and a memory 312 for working data and program data. The airbag unit 130 is also connected to the communication bus 350, and the touch-sensitive screen display 122, which combines an input unit 122a together with a graphical output unit 122b, is also connected.

In addition, the sensors 320 which are for detection of movement data of the vehicle are connected to the bus, along with electrical and mechanical control systems 330 of the vehicle, a data memory unit 340 for storing operating data, a mobile telephone unit 370 for communicative connection of the vehicle to speech and data wireless functions as well as a network interface 360 for connecting the vehicle to the network 400, for example, a private network (for example, of the user and/or the vehicle manufacture) or the Internet.

Figure 9A:
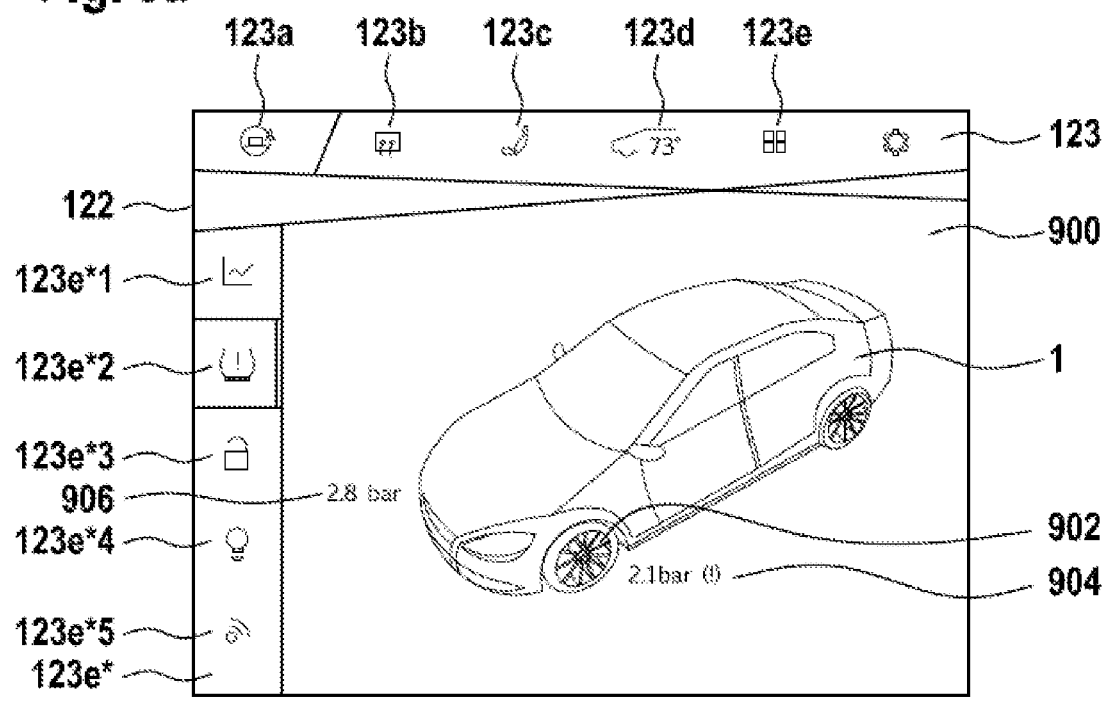
FIGS. 9a-9b show two example of implementation of functionalities of a vehicle which are optionally selected on the screen display of function parameters that can be displayed for a user (FIG. 9a) or adjustment options for function parameters of selected functionalities of a vehicle that can be displayed on a screen display for a user (FIG. 9b).

FIG. 9a shows an example of implementation optionally on the screen display 122 of function parameters that can be displayed for a user or status parameters of a functionality of a vehicle selected here only as an example, namely the tire pressure in the front tires of the vehicle. First in the header line of the screen display 122 a type of menu line 123 is displayed for central and rapid selection of certain categories represented by corresponding graphical symbols 123a-123e. The header line 123 shows from left to right: a symbol 123a representing a switch for selecting between manual, semi-autonomous or autonomous driving mode; a symbol 123b for activation of deicing of the windshield; a symbol 123c for selecting the setting options for the driver's seat (see also FIG. 9b); a symbol 123d for selecting the setting options for the air conditioning system; and a symbol 123e for selecting a menu 123e* for general control functions and/or status functions.

At the left edge of the screen display 122, FIG. 9a shows the menu 123e* for general control functions and/or status functions. Therefore symbols 123e*1-123e*5 are shown as examples by means of which individual submenus can be retrieved, for example, statistical functions 123e*1, tire pressure 123e*2, vehicle lock 123e*3, lighting/interior lighting 123e*4 and mobile telephone function 123e*5.

In FIG. 9a, the user has selected the submenu for the "tire pressure" status. The control unit 310 of FIGS. 7 and 8 is configured accordingly to display for the user of vehicle 1 as the user of the system, vehicle status parameters 900 on the screen display 122. FIG. 9a shows as an example of a vehicle status parameter 900 the tire pressure 904, 906 of the front tires 902 of the vehicle 1. Therefore the vehicle 1 is represented symbolically for the user on the screen display 122 and the prevailing tire pressure 904, 906 is displayed near the front wheels 902. In this example, the right front tire has a pressure of 2.8 bar, while the pressure in the left front tire is too low at 2.1 bar—to which the user's attention is drawn by the warning symbol (!).

The control unit 310 may be configured so that, whenever a status parameter requires the user's attention or an action to be performed by the user, the corresponding menu will automatically be displayed on the screen display 122.

In addition to the tire pressure values of individual tires or all tires of the vehicle 1, as an alternative additional function parameters of the vehicle can be made to display on the screen display 122 by a user as an alternative.

Additional function parameters may include (not all are exclusive): the prevailing outside temperature, prevailing weather data on the surroundings in which the vehicle is presently located, operating parameters of the vehicle 1 such as the charge status of a drive battery of vehicle 1, parameters of an entertainment system and/or a multimedia system of the vehicle, etc.

As already discussed elsewhere, the control unit 310 is operatively and communicatively connected to at least one functionality of the vehicle and is configured for controlling and/or transmitting operating parameter to at least one functionality. Therefore the control unit 310 is configured to display on the screen display 122 at least one control element for the setting of operating parameters of the at least one functionality of the vehicle for control by a user by means of touch or a touch gesture.

Figure 9B:
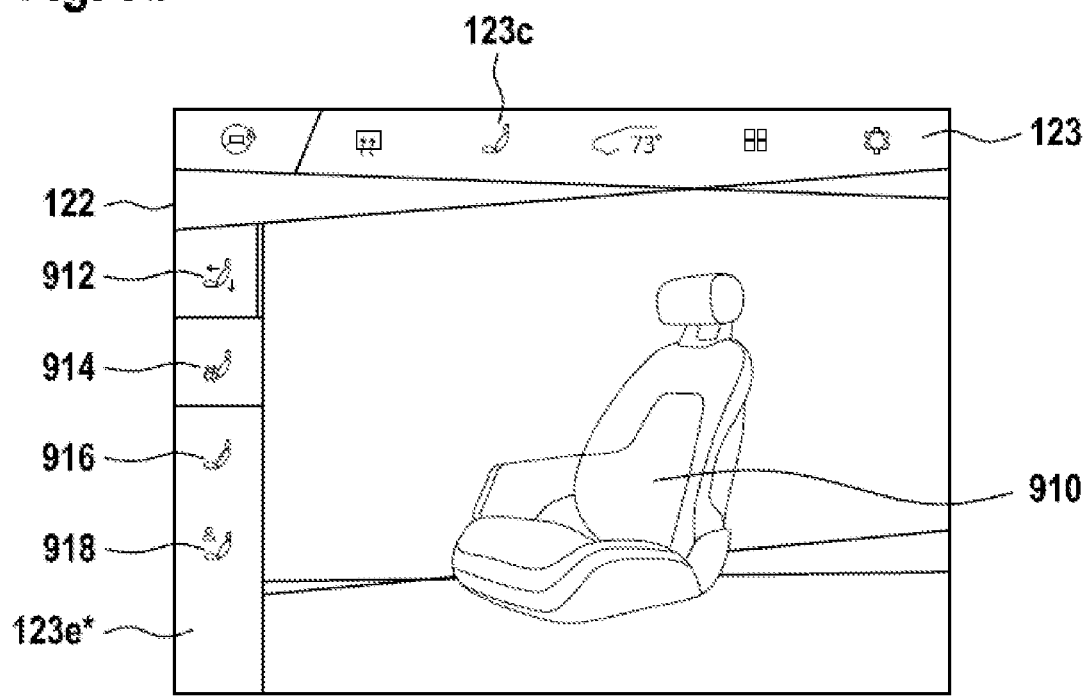

FIG. 9b shows an example of implementation of a setting options that can optionally be displayed on the screen display 122 for function parameters of a functionalities of the vehicle 1 shown here only as an example, namely the setting parameters for a vehicle seat 910, for example, the driver's seat. To do so, the user has selected the symbol 123c for the seat adjustment in the header line 123 of the screen display 122.

For control by the user, input elements 912, 914, 916, 918 are shown graphically on the left edge of the screen display 122 as a submenu 123c* so that the user can make a corresponding adjustment of the driver's seat 910 by means of touch or a touch gesture via these input elements 912 (inclination of the back rest), 914 (setting of the seat heating), 916 (setting of the lumbar support), 918 (storage of personal settings).

In addition to the setting option for a vehicle seat as illustrated in FIG. 9b, additional (not exclusive) function parameters of respective vehicle functionalities may optionally be set as an alternative such as: cruise control, entertainment system and/or multimedia system, mobile telephone, inclination and/or longitudinal direction settings of the steering device 100.

Likewise, symbols for selection of additional functions may also be provided on the screen display 122 at predetermined or configurable locations such as: symbol or icon to display installed software applications on the screen display 122; symbol or icon to retrieve a localization function or navigation function and display it on the screen display 122; symbol or icon to retrieve a mobile telephone function and display it on the screen display 122; symbol or icon to retrieve a message exchange function such as short messages and/or email and display it on the screen display 122 and/or the status; symbol or icon to retrieve the setting options of an entertainment system and/or multimedia system and display them on the screen display 122.

Figure 10:
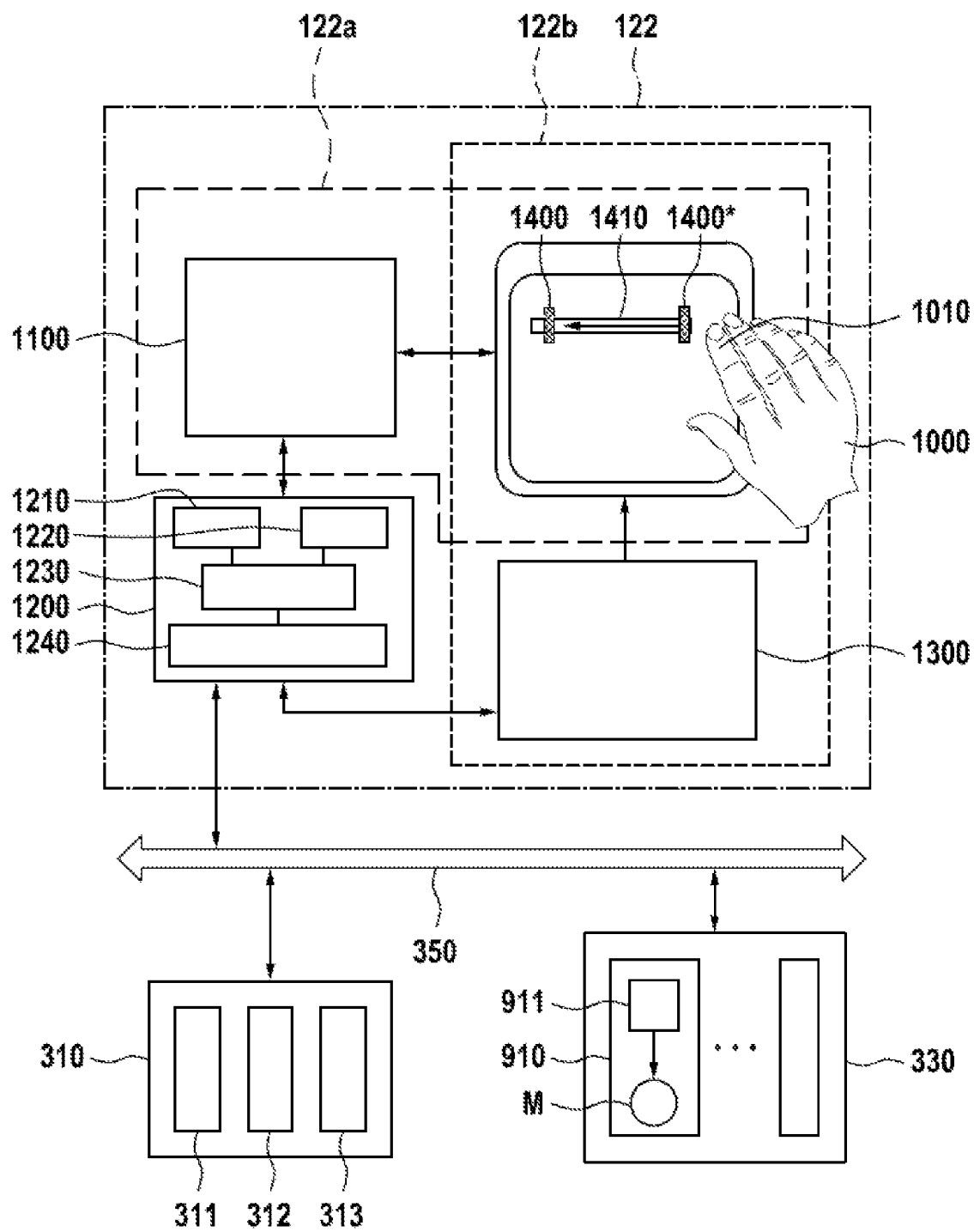
FIG. 10 illustrates the system from FIG. 8 with the focus on the touch-sensitive screen display 122 as a graphical user interface for control input by a user of the system.

FIG. 10 illustrates the system 300 with the focus on the touch-sensitive screen display 122 as a user interface.

As pointed out in conjunction with FIGS. 7-8, the screen display 122 combines an input unit 122a with an output unit 122b. A user can interact with this graphical user interface via a screen display 122 by touching graphical symbols displayed on the screen display 122 and/or by carrying out predetermined touch gestures using one or more fingers 1010 on his hand 1000 in a manner that is known per se (e.g., from smartphones). By way of this interaction, the user can then control one or more functions and functionalities of the vehicle.

The screen display 122 is equipped with a flat screen such as a TFT screen together with a screen driver 1300 as an output unit 122a in a manner that is known per se.

The screen surface is embodied for detecting touch which forms the input unit 122a of the user interface so that the location of a touch can be determined. The location of a touch in particular can be determined in a known way by means of a resistive matrix, a capacitive matrix or an infrared matrix integrated into the screen display in a known way, to name but a few examples that are not exclusive.

The screen display 122 may fundamentally be designed only for detecting a touch (single touch screen) but is preferably also designed for detecting two touches at the same time (dual touch screen) and especially preferably equipped for detecting more than two touches at the same time (multi-touch screen). In other words, it is especially preferable for the screen display 122 to be able to detect as many touch points as possible at the same time. Therefore, all known control gestures and gestures yet to be developed may be implemented.

The input unit 122a thus consists of the touch-sensitive part of the screen display 122 and a respective detection unit 1100, which is equipped to detect touches or touch gestures (e.g., swipe, zoom-in, zoom-out, etc.) and to transfer this information to a controller 1200 in the form of touch data.

An interaction of the user with the screen display 122 and therefore with the control unit 310 connected thereto it is possible by means of the display of graphical content on the output unit 122b of the screen display 122 and the simultaneous detection of touch by the user by means of the input unit 122a.

The controller 1200 is connected to a screen driver 1300, which in turn forms an output unit 122b together with the TFT screen.

The controller 1200 is connected to the control unit 310 via the communication bus 350.

The control unit 310 is connected to the electrical and/or mechanical systems 330 of the vehicle by the communication bus 350 etc.

The controller 1200 is designed essentially in the manner of a microcontroller and therefore has working memories 1210 and memories 1220, a processing unit 1230 and an input-output interface 1240 for communication with the control unit 310 via the communication bus 350. The processing unit 1230 is of course connected with the detection unit 1100 and to the screen driver 1300.

The processing unit 1230 is essentially equipped to implement a graphical user interface between the user of the system and the control unit 310. In other words, depending on the context, the corresponding graphical content and screen menus are displayed for the user on the screen display 122 via the screen driver 1300, and corresponding entries by the user by means of touch and/or touch gestures are detected by the detection unit 1100. The inputs thereby detected are transferred from the processing unit 1230 to the control unit 310 via the communication bus 350 and by means of the input/output unit 1240.

When a touch or multiple touches of the screen unit 122 by the user is/are detected by the detection unit 1100 and transferred to the controller 1200, the processing unit 1230 of the controller 1200 then derives from the detected touch pattern the control input intended by the user, i.e., the touch is translated in the context of the prevailing display content of the screen display 122 into a corresponding input, such as, for example, binary zero/one information, as in the case of a simple touch of a graphical switch, for example.

Alternatively, the input detected may also be a value from any allowed, finely subdivided value range for an operating parameter or an adjustment parameter of a functionality of the vehicle.

If the touch input is a touch gesture with one or more touches, then the processing unit 1230 is equipped to first detect the touch gesture as such in a first step in order to then derive the respective input. For recognition of gestures, the processing unit 1230 may have a library, a database or a lookup table (or a combination thereof) for predetermined gestures stored in the memory 1220, for example, the contents of which can be searched by the processing unit 1230 using a suitable algorithm for locating and assigning a detected gesture to predetermined (i.e., known) gestures.

After detecting the input gesture, the corresponding control input by the user is derived from that.

To illustrate the function of the system 300, the electromechanical system of the driver's seat 910 will now be used as an example in FIG. 10.

The driver's seat 910 has a seat controller 911, which is communicatively coupled to the control unit 310 via the communication bus 350.

The control unit 310 is essentially a computer system with the usual components, including a memory 312, processor 311 and input/output interface unit 313 for communication with the other components of the system 300 via the communication bus 350, in particular the controller 1200 of the screen display 122.

The control unit 310 can send control commands to the seat controller 911 in this way and can also receive adjustment parameter data/status data (inclination of the back rest, seat heating on/off, position of the lumbar support, etc.) from the seat controller 911.

The electromechanical system of the driver seat 910 therefore has corresponding sensors to detect the adjustment parameter data/status data.

The electromechanical system of the driver's seat 910 additionally has corresponding actuators to be able to make the seat adjustments corresponding to the desired control input.

For example, the driver's seat has an adjusting motor M as the actuator for the inclination of the back rest. By means of a corresponding control command, the control unit 310 may instruct the seat controller 911 to change the inclination of the back rests. In response to such a control command, the seat controller 911 activates the adjusting motor M and thereby changes the inclination of the back rest accordingly. The prevailing inclination is detected by an inclination sensor (not shown) and reported by the seat controller 911 to the control unit 310 via the communication bus 350 or queried from the control unit on demand.

If the user of the vehicle wants to change the inclination of the driver's seat 910, he can, for example, retrieve the screen menu illustrated in FIG. 9b and select the symbol 912 there by means of touch.

In this example, a slide 1400, which can be moved from a first maximum left position to the right up to a maximum right position is shown merely to illustrate the principle on the screen display 122. The two maximum positions may correspond to the inclination of the back rest of the driver's seat 910 that is allowed or is the maximum possible mechanically.

The function of the system 300 can thus be summarized briefly as follows: by means of a corresponding menu on the screen display 122, an input is made by the user of the system 300 by means of touch or a touch gesture. This input is detected by the controller 1200 of the screen display 122 and forwarded to the control unit 310 where both the actual adjustment parameters of the individual functionalities of the vehicle are stored more or less as status parameters in the memory 312. Likewise, current control input by the user is stored in the memory 312. Therefore, a respective program can derive a necessary control command on the processor of the control unit 310 from the deviation between the status parameters and the current control inputs. The control command(s) is/are forwarded to the respective control unit, for example, the seat controller 911 via the communication bus 350. The control unit converts the control command(s) by activation of corresponding activators. In the example of the seat controller 911, the seat controller 911 activates an adjusting motor M, for example, and thus results in the required seat adjustment, for example, a change in the inclination of the back rest.

Accordingly, as explained on the basis of the example with the seat controller 911, fundamentally any or all other functions and functionalities present nor or in the future in a model vehicle can be controlled in this way. By means of the touch-sensitive screen display 122 disposed centrally on the central part 120, control input can be implemented intuitively and thus easily by the user at a single location, wherein graphical acknowledgements may be sent in response to the control input at the same location in the vehicle, namely on the screen display 122.

The controllable functionalities may be, for example, all the functions and functionalities mentioned elsewhere here above. For example, an entertainment system or sound system or multimedia system or mobile wireless system should be mentioned here again (but not exclusively), the loudness of which by means of corresponding control inputs on the central part 120. Similar control input are for functionalities such as a navigation system, a telephone system or other automotive systems such as, for example, adjustment/setting of the steering (soft/tight, stronger supported/less supported), chassis (damping comfortable or sporty and hard), air conditioning system, interior lighting, exterior lighting, vehicle lock, etc.

What is claimed is:

1. A steering device for a vehicle comprising:
   a steering wheel, a steering wheel hub, or steering wheel spokes connected in a rotationally fixed manner to a rotatable steering shaft in a steering column for transmission of a steering motion;
   a central part, which is disposed in a stationary position with respect to the steering wheel in a central region defined by the steering wheel and which has a visible surface area in the central region formed predominantly by a screen display, wherein the screen display is an input/output device and is configured for control of at least one functionality of the vehicle; and
   a remaining portion of the surface area visible in the central region is formed by an airbag cover in proximity to the screen display, and an airbag unit with an airbag is disposed beneath the airbag cover on the central part so that the airbag can unfold by opening of the airbag cover in front of the steering device and in front of the screen display, and
   wherein the airbag unit is disposed decentrally relative to a central axis of the steering column, and wherein the airbag unit is disposed at an angle inclined relative to the central axis of the steering column in a direction of the screen display such that an airbag outlet direction forms an acute angle with a plane of a display of the display screen and an obtuse angle relative to the central axis, and wherein a surface of the screen display is perpendicular to the central axis of the steering column.

2. The device according to claim 1, wherein
   the airbag within the airbag unit is configured to unfold by opening of the airbag cover in front of the steering device and in a downward direction away from the screen display.

3. The device according to claim 1, wherein the steering wheel is coupled to a rotatable steering shaft for transmission of the steering motion to the steering shaft via the steering wheel hub or steering wheel spoke.

4. The device according to claim 1, wherein the airbag cover is disposed so that the airbag cover is elevated with respect to the screen display.

5. The device according to claim 1, wherein
   the airbag unit comprises an airbag container for receiving the airbag before the airbag is unfolded out of the airbag container, and
   the airbag container has a container length, which is greater than a container diameter of the airbag container in at least one airbag outlet opening.

6. The device according to claim 5, wherein at least one of the following is true:
   the airbag container is a tubular, cylindrical or conical container;
   the container diameter of the airbag container lies in the plane of the airbag outlet opening which is inclined with respect to a plane defined by the screen display; and
   the airbag outlet opening and/or the airbag container has/have a cross-sectional area defined by a small container axis and a large container axis.

7. The device according to claim 1, wherein
   the device is equipped for arrangement in a passenger area of the vehicle.

8. The device according to claim 1, wherein
   the screen display is a touch-sensitive screen display in the form of a touch screen display, and wherein the screen display
   is either integrated fixedly into the central part
   or is a tablet computer integrated releasably into the central part.

9. The device according to claim 1, wherein adjacent to the screen display configurable input elements are disposed on one or both side edges of the screen display, and wherein the input elements comprise a mechanical and/or electromechanical input element.

10. A steering column in a vehicle having a steering device for the vehicle comprising:
    a steering wheel, a steering wheel hub, or steering wheel spokes connected in a rotationally fixed manner to a rotatable steering shaft in the steering column for transmission of a steering motion;
    a central part, which is disposed in a stationary position with respect to the steering wheel in a central region defined by the steering wheel and which has a visible surface area in the central region formed predominantly by a screen display, wherein the screen display is an input/output device and is configured for control of at least one functionality of the vehicle;
    wherein an airbag unit is disposed in in proximity to a housing of the steering column, and a longitudinal axis of an airbag container runs in proximity to or inside the steering column, and
    wherein the airbag unit is disposed decentrally relative to a central axis of the steering column, and wherein the airbag unit is disposed at an angle inclined relative to the central axis of the steering column in a direction of the screen display such that an airbag outlet direction forms an acute angle with a plane of a display of the display screen and an obtuse angle relative to the central axis, and wherein a surface of the screen display is perpendicular to the central axis of the steering column.

11. A system for a vehicle having a steering device and a control unit which is communicatively and operatively connected to a screen display, wherein the steering device for the vehicle comprises:

a steering wheel, a steering wheel hub, or steering wheel spokes connected in a rotationally fixed manner to a rotatable steering shaft in a steering column for transmission of a steering motion; and a central part, which is disposed in a stationary position with respect to the steering wheel in a central region defined by the steering wheel and which has a visible surface area in the central region formed predominantly by the screen display, wherein the screen display is an input/output device and is configured for control of at least one functionality of the vehicle; and a remaining portion of the surface area visible in the central region is formed by an airbag cover in proximity to the screen display, and an airbag unit with an airbag is disposed beneath the airbag cover, and wherein the airbag unit is disposed decentrally relative to a central axis of the steering column, and wherein the airbag unit is disposed at an angle inclined relative to the central axis of the steering column in a direction of the screen display such that an airbag outlet direction forms an acute angle with a plane of a display of the display screen and an obtuse angle relative to the central axis, and wherein a surface of the screen display is perpendicular to the central axis of the steering column.

12. A system and at least a steering device, wherein the system for a vehicle having a steering device and a control unit which communicatively and operatively connects to a screen display, wherein the steering device for the vehicle comprises:

a steering wheel, a steering wheel hub or steering wheel spokes connected in a rotationally fixed manner to a rotatable steering shaft in a steering column for transmission of a steering motion;

a central part, which is disposed in a stationary position with respect to the steering wheel in a central region defined by the steering wheel and which has a visible surface area in the central region formed predominantly by the screen display, wherein the screen display is an input/output device and is configured for control of at least one functionality of the vehicle; and the control unit which is communicatively and operatively connected to the screen display, wherein the remaining portion of the surface area visible in the central region is formed by an airbag cover in proximity to the screen display, and an airbag unit with an airbag is disposed beneath the airbag cover on the central part so that the airbag can unfold by opening of the airbag cover in front of the steering device and in front of the screen display, wherein the airbag unit is communicatively and operatively connected to the control unit, and wherein the airbag unit is disposed decentrally relative to a central axis of the steering column, and wherein the airbag unit is disposed at an angle inclined relative to the central axis of the steering column in a direction of the screen display such that an airbag outlet direction forms an acute angle with a plane of a display of the display screen and an obtuse angle relative to the central axis, and wherein a surface of the screen display is perpendicular to the central axis of the steering column.

13. The system according to claim 12, wherein the control unit is equipped for providing at least one safety function wherein the airbag unit is equipped to be deployed by the control unit and wherein the control unit is equipped to deploy the airbag unit after detection of collision conditions in order to eject and unfold the airbag contained in the airbag unit.

14. The system according to claim 12, wherein the system further comprises:

a plurality of sensors communicatively coupled to the control unit and configured to detect motion data on the vehicle for detection of a collision of the vehicle; and the control unit is configured to, in response to detection of a collision of the vehicle based on at least the motion data of the sensors, deploy the airbag unit.

15. The system according to claim 11, wherein the control unit is operatively and communicatively connected to at least one functionality of the vehicle and is configured for controlling and/or transmitting operating parameters to the at least one functionality.

16. The system according to claim 15, wherein the control unit is configured to display on the screen display at least one control element for adjusting the operating parameters of the at least one functionality of the vehicle for control by a user by means of touch or touch gestures.

17. The system according to claim 15, wherein the at least one functionality of the vehicle comprises:

a driving mode of the vehicle, comprising: manual, semi-autonomous, or autonomous driving;

an air conditioning system comprising: the volume of air, vent valves, seat heating, temperature in the passenger area, or in predetermined zones of the passenger area;

a deicing function and/or a window heating function for at least one window of the vehicle;

a seat adjustment comprising: adjustment of the back rest, the seat height, or a lower back support;

a general function comprising: light, brightness of the instruments, and/or background lighting of the interior of a vehicle;

a cruise control function;

an entertainment system and/or multimedia system and/or sound system;

a mobile telephone;

an inclination and/or longitudinal direction adjustment of the steering device.

18. The system according to claim 15, wherein the control unit is configured to display symbols for at least one function on the screen display at predetermined or configurable locations, comprising:

a symbol or icon to display installed software applications on the screen display;

a symbol or icon to retrieve a localization function and/or navigation function and display the localization function and/or navigation function on the screen display;

a symbol or icon to retrieve a mobile telephone function and display the mobile telephone function on the screen display, a symbol or icon to retrieve a message exchange function comprising short messages and/or email, and display the message exchange function on the screen display and/or display a status of short messages and/or email; and a symbol or icon to retrieve settings options of an entertainment system and/or a multimedia system and display the retrieved settings on the screen display.

19. The system according to claim 11, wherein the control unit is configured to display on the screen display at least one parameter for a user, comprising:

a tire pressure values of individual tires or all tires of the vehicle;

an exterior temperature;

a weather data on the surroundings;

an operating parameters of the vehicle;

a charge status of a drive battery of the vehicle; and one or more parameters of an entertainment system and/or a multimedia system and/or sound system.

20. A vehicle having a steering device, wherein the steering device comprises:

a steering wheel, a steering wheel hub, or steering wheel spokes connected in a rotationally fixed manner to the steering wheel for transmission of a steering motion, a central part, which is disposed in a stationary position with respect to the steering wheel in a central region defined by the steering wheel and which has a visible surface area in the central region formed predominantly by a screen display, wherein the screen display is an input/output device and is configured for control of at least one functionality of the vehicle;

a steering column in the vehicle comprising an airbag unit disposed in proximity to a housing of the steering column, and a longitudinal axis of an airbag container of the airbag unit runs in proximity to or inside the steering column; and a control unit communicatively and operatively connected to the screen display; and wherein the airbag unit is disposed decentrally relative to a central axis of the steering column, and wherein the airbag unit is disposed at an angle inclined relative to the central axis of the steering column in a direction of the screen display such that an airbag outlet direction forms an acute angle with a plane of a display of the display screen and an obtuse angle relative to the central axis, and wherein a surface of the screen display is perpendicular to the central axis of the steering column.

* * * * *